United States Patent
Li

(10) Patent No.: US 11,705,054 B2
(45) Date of Patent: Jul. 18, 2023

(54) DISPLAY PANEL DRIVING CIRCUIT AND DISPLAY PANEL

(71) Applicant: TCL China Star Optoelectronics Technology Co., Ltd., Guangdong (CN)

(72) Inventor: Yan Li, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 301 days.

(21) Appl. No.: 17/255,481

(22) PCT Filed: Dec. 18, 2020

(86) PCT No.: PCT/CN2020/137427
§ 371 (c)(1),
(2) Date: Dec. 23, 2020

(87) PCT Pub. No.: WO2022/116283
PCT Pub. Date: Jun. 9, 2022

(65) Prior Publication Data
US 2022/0406240 A1 Dec. 22, 2022

(30) Foreign Application Priority Data
Dec. 2, 2020 (CN) .......................... 202011405881.7

(51) Int. Cl.
*G09G 3/32* (2016.01)
(52) U.S. Cl.
CPC ....... *G09G 3/32* (2013.01); *G09G 2300/0842* (2013.01); *G09G 2310/0278* (2013.01); *G09G 2320/0271* (2013.01)

(58) Field of Classification Search
CPC ............. G09G 3/32; G09G 2310/0278; G09G 2300/0842; G09G 2320/0271
See application file for complete search history.

(56) References Cited

U.S. PATENT DOCUMENTS

2003/0151575 A1   8/2003   Udo et al.
2007/0279333 A1   12/2007  Kim
(Continued)

FOREIGN PATENT DOCUMENTS

CN   1637821      7/2005
CN   101903934    12/2010
(Continued)

*Primary Examiner* — Muhammad N Edun

(57) ABSTRACT

The present application discloses a display panel driving circuit and a display panel. The display panel driving circuit includes a driving circuit and a light-emitting diode. The driving circuit is connected to the light-emitting diode. The driving circuit includes a plurality of superimposed driving modules, and a corresponding number of driving modules are selectively conducted according to a preset grayscale. Each driving module includes a scan control transistor, a switch transistor and a drive transistor, in each driving module the scan control transistor is connected to the drive transistor via the switch transistor, in each driving module a first end of the scan control transistor is connected to a scan signal terminal, and the light-emitting diode and the drive transistors of the driving modules are sequentially connected. The present application can better increase the number of grayscales, thereby improving image quality.

14 Claims, 2 Drawing Sheets

(56) References Cited

U.S. PATENT DOCUMENTS

| | | |
|---|---|---|
| 2010/0141646 A1 | 6/2010 | Tanabe |
| 2020/0286430 A1* | 9/2020 | Wu .................. G09G 3/3291 |
| 2021/0241695 A1* | 8/2021 | Xuan ................ G09G 3/3266 |

FOREIGN PATENT DOCUMENTS

| | | |
|---|---|---|
| CN | 104599634 | 5/2015 |
| CN | 107591125 | 1/2018 |
| CN | 107818759 | 3/2018 |
| CN | 110021261 | 7/2019 |
| CN | 110021265 | 7/2019 |
| CN | 110473494 | 11/2019 |
| CN | 111316345 | 6/2020 |
| CN | 111785212 | 10/2020 |
| JP | 2004-191752 | 7/2004 |
| WO | WO 99/52095 | 10/1999 |

\* cited by examiner

DISPLAY PANEL DRIVING CIRCUIT AND DISPLAY PANEL

RELATED APPLICATIONS

This application is a National Phase of PCT Patent Application No. PCT/CN2020/137427 having International filing date of Dec. 18, 2020, which claims the benefit of priority of Chinese Patent Application No. 202011405881.7 filed on Dec. 2, 2020. The contents of the above applications are all incorporated by reference as if fully set forth herein in their entirety.

FIELD AND BACKGROUND OF THE INVENTION

The present application relates to display technologies, and more particularly to a display panel driving circuit and a display panel.

Mini light-emitting diodes (Mini LEDs) are used in liquid crystal display (LCD) backlight technologies. By introducing packaging, size reducing and mass transfer technologies, the abilities to control backlight areas and reduce optical distance of the backlight are improved, thereby realizing backlight technologies with ultra-thin, power-saving, flexible and high-dynamic range (HDR) advantages. The mini-LED backlight is arranged in a high-density matrix, and thus can better achieve fine local dimming, and its power consumption performance is better than traditional backlight technologies.

FIG. 1 is a schematic diagram illustrating a display panel driving circuit using mini light-emitting diodes in relevant arts. In FIG. 1, the display panel driving circuit with a mini light-emitting diode includes a scan control transistor T2, a storage capacitor Cs, a drive transistor T1 and a light-emitting diode LED. The gate of the scan control transistor T2 is connected to a scan signal SCAN, the source of the scan control transistor T2 is connected to a data signal DATA, and the drain of the scan control transistor T2 is connected to one end of the storage capacitor and the gate of the drive transistor T1. The drain of the drive transistor T1 is connected to the cathode of the light-emitting diode LED. The anode of the light-emitting diode LED is connected to a power voltage input terminal. The other end of the storage capacitor Cs and the source of the drive transistor T1 is connected to a grounded terminal.

When the scan signal is high level, a scan function is enabled. After that, the data signal jumps to high level, and the scan control transistor T2 is switched on, so that the drive transistor T1 is switched on, and then the light-emitting diode LED emits light when an electric current passes through the light-emitting diode LED. However, with market demands and improvement of LED specifications, this solution is restricted by the properties of LED lights and other factors, resulting in inability to efficiently adjust the brightness of the display panel, and the number of gray levels cannot increase efficiently, thereby affecting the image quality.

SUMMARY OF THE INVENTION

Embodiments of the present application provide a display panel driving circuit and a display panel, which can better increase the number of grayscales, thereby improving image quality.

An embodiment of the present application provides a display panel driving circuit, which includes: a driving circuit and a light-emitting diode, the driving circuit connected to the light-emitting diode, wherein the driving circuit includes a plurality of superimposed driving modules, and a corresponding number of driving modules are selectively conducted according to a preset grayscale, wherein each driving module includes a scan control transistor, a switch transistor and a drive transistor, in each driving module the scan control transistor is connected to the drive transistor via the switch transistor, in each driving module a first end of the scan control transistor is connected to a scan signal terminal, and the light-emitting diode and the drive transistors of the driving modules are sequentially connected.

Further, in each driving module a second end of the scan control transistor is connected to the first end of the switch transistor, third ends of the scan control transistors of the driving modules are connected to different data signal terminals, in each driving module the second end of the switch transistor is connected to the third end of a corresponding drive transistor, and in each driving module the third end of the switch transistor is connected to a grounded terminal; and wherein the first ends of the drive transistors of the driving modules are connected to different chip select signal terminals, the second end of the drive transistor of a later driving module is connected to the third end of the drive transistor of a previous driving module, the second end of the drive transistor of the driving module located closest to the light-emitting diode is connected to a cathode of the light-emitting diode, an anode of the light-emitting diode is connected to a power voltage input terminal, and the drive transistors are selectively switched on by chip select signals inputted via the chip select signal terminals for adjusting an electric current passing through the light-emitting diode.

Further, the driving circuit includes a storage capacitor, in each driving module the second end of the scan control transistor is connected to one end of the storage capacitor, and the other end of the storage capacitor is connected to the grounded terminal.

Further, the storage capacitor is configured to store grayscale voltages inputted via the data signal terminals.

Further, the switch transistor is a metal—oxide—semiconductor (MOS) transistor.

Further, the scan control transistor, the MOS transistor and the drive transistor are thin-film transistors.

Further, the first end is a gate, the second end is a drain, and the third end is a source.

Further, a ratio of channel width to channel length is different for each MOS transistor.

Further, the ratios of the channel width to the channel length for the MOS transistors are different integral multiples of the ratio of the channel width to the channel length of the MOS transistor located closest to the light-emitting diode.

Further, when a data signal inputted via a target data signal terminal is high level and other data signals inputted via other data signal terminals are low level, the MOS transistor connected to the target data signal terminal is switched on.

Further, the target data signal terminal is defined by one data signal terminal or by different data signal terminals.

Further, based on the preset grayscale, the chip select signal terminals divide grayscales independent from the data signal terminals.

In an embodiment, the present application provides a display panel, which including the display panel driving circuit provided in the embodiment of the present application.

In the embodiments of the present application, the driving circuit and the light-emitting diode are deployed. The driving circuit includes a plurality of superimposed driving modules, and a corresponding number of driving modules are selectively conducted according to a preset grayscale. Each driving module includes a scan control transistor, a switch transistor and a drive transistor. By switching on different switch transistors and selectively conducting or enabling one or more drive transistors, different sizes of electric currents can be obtained. In such a way, the electric current passing through the light-emitting diode LED may be adjusted. It is convenient to increase the number of brightness levels. Therefore, the embodiment of the present application can better increase the number of grayscales, thereby improving image quality.

DESCRIPTION OF SPECIFIC EMBODIMENTS OF THE INVENTION

Figure 1:
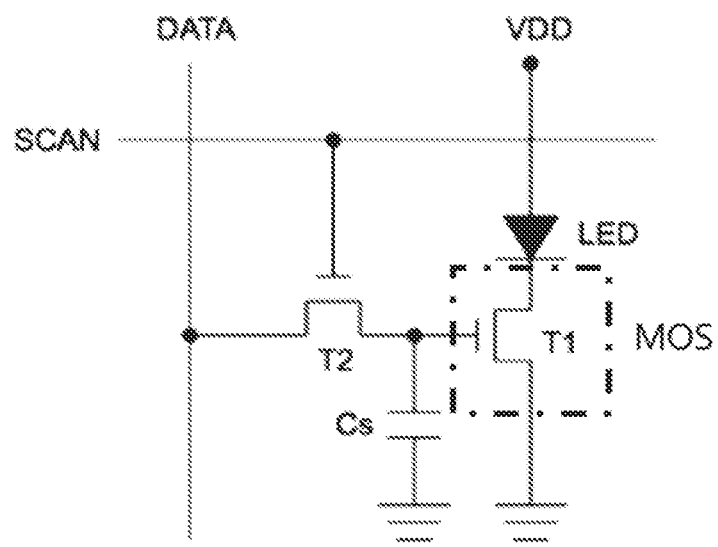
FIG. 1 is a schematic diagram illustrating a display panel driving circuit using mini light-emitting diodes in relevant arts.

The technical solutions in the embodiments of the present application will be clearly and completely described below with reference to appended drawings of the embodiments of the present application. Obviously, the described embodiments are merely a part of embodiments of the present application and are not all of the embodiments. Based on the embodiments of the present application, all the other embodiments obtained by those of ordinary skill in the art without making any inventive effort are within the scope of the present application.

An embodiment of the present application provides a display panel driving circuit, which includes:

a driving circuit and a light-emitting diode, the driving circuit connected to the light-emitting diode, wherein the driving circuit includes a plurality of superimposed driving modules, and a corresponding number of driving modules are selectively conducted according to a preset grayscale, wherein each driving module includes a scan control transistor, a switch transistor and a drive transistor, in each driving module the scan control transistor is connected to the drive transistor via the switch transistor, in each driving module a first end of the scan control transistor is connected to a scan signal terminal, and the light-emitting diode and the drive transistors of the driving modules are sequentially connected.

In an embodiment of the present application, in each driving module a second end of the scan control transistor is connected to the first end of the switch transistor, third ends of the scan control transistors of the driving modules are connected to different data signal terminals, in each driving module the second end of the switch transistor is connected to the third end of a corresponding drive transistor, and in each driving module the third end of the switch transistor is connected to a grounded terminal; and wherein the first ends of the drive transistors of the driving modules are connected to different chip select signal terminals, the second end of the drive transistor of a later driving module is connected to the third end of the drive transistor of a previous driving module, the second end of the drive transistor of the driving module located closest to the light-emitting diode is connected to a cathode of the light-emitting diode, an anode of the light-emitting diode is connected to a power voltage input terminal, and the drive transistors are selectively switched on by chip select signals inputted via the chip select signal terminals for adjusting an electric current passing through the light-emitting diode.

In an embodiment of the present application, the driving circuit includes a storage capacitor, in each driving module the second end of the scan control transistor is connected to one end of the storage capacitor, and the other end of the storage capacitor is connected to the grounded terminal.

In an embodiment of the present application, the storage capacitor is configured to store grayscale voltages inputted via the data signal terminals.

In an embodiment of the present application, the switch transistor is a metal-oxide-semiconductor (MOS) transistor.

In an embodiment of the present application, the scan control transistor, the MOS transistor and the drive transistor are thin-film transistors.

In an embodiment of the present application, the first end is a gate, the second end is a drain, and the third end is a source.

In an embodiment of the present application, a ratio of channel width to channel length is different for each MOS transistor.

In an embodiment of the present application, the ratios of the channel width to the channel length for the MOS transistors are different integral multiples of the ratio of the channel width to the channel length of the MOS transistor located closest to the light-emitting diode.

In an embodiment of the present application, when a data signal inputted via a target data signal terminal is high level and other data signals inputted via other data signal terminals are low level, the MOS transistor connected to the target data signal terminal is switched on.

In an embodiment of the present application, the target data signal terminal is defined by one data signal terminal or by different data signal terminals.

In an embodiment of the present application, based on the preset grayscale, the chip select signal terminals divide grayscales independent from the data signal terminals.

In an embodiment of the present application, the driving circuit is of an integrated MOS chip.

In an embodiment of the present application, the plurality of driving modules and the storage capacitor are disposed inside the integrated MOS chip.

An embodiment of the present application further provides a display panel, which includes the afore-described display panel driving circuit.

Figure 2:
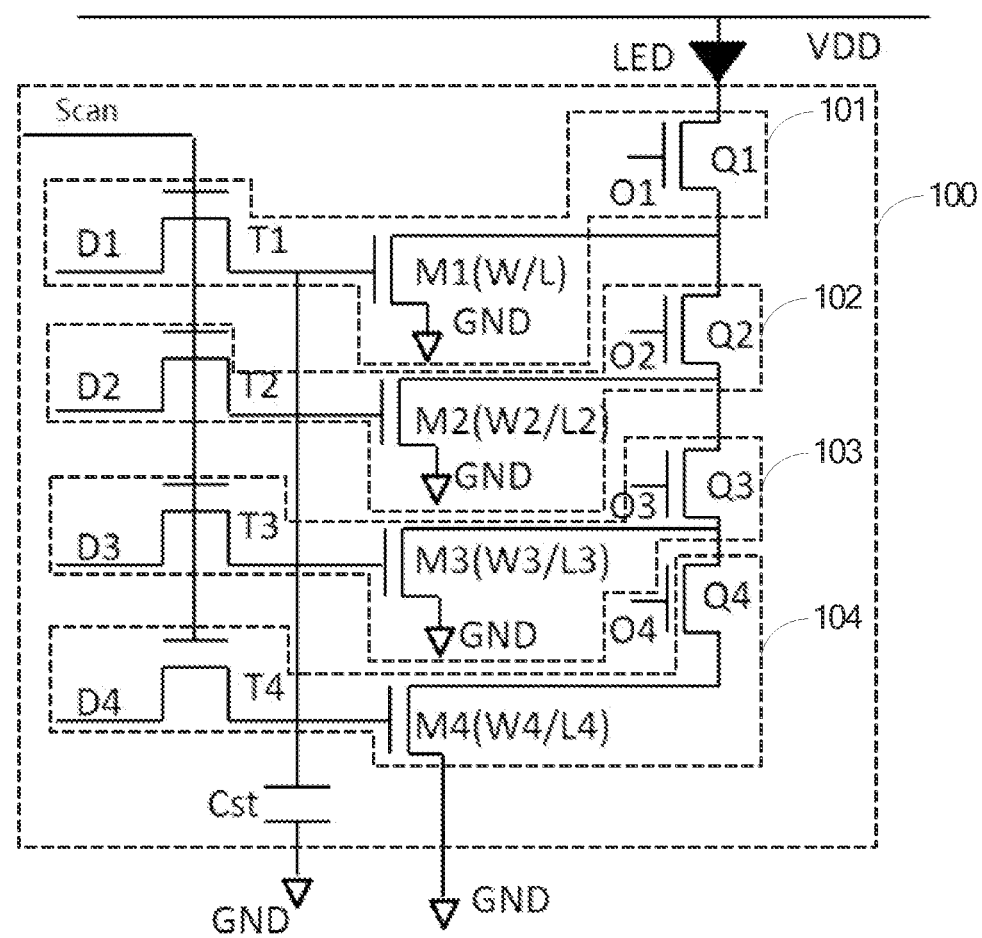
FIG. 2 is a schematic diagram illustrating a display panel driving circuit provided in an embodiment of the present application.

FIG. 2 is a schematic diagram illustrating a display panel driving circuit provided in an embodiment of the present application. The display panel driving circuit includes a driving circuit 100 and a light-emitting diode LED. The driving circuit 100 is connected to the light-emitting diode LED.

The driving circuit 100 includes a plurality of superimposed driving modules. A corresponding number of driving modules are selectively conducted by the driving circuit 100 according to a preset grayscale. For example, the driving circuit 100 may selectively enable one driving module according to the preset grayscale. In another example, the driving module 100 may selectively enable four driving modules according to the preset grayscale. In yet another example, the driving module 100 may selectively enable six driving modules according to the preset grayscale. Different numbers of driving modules are selectively enabled or conducted in response to different grayscales.

In FIG. 1, a driving circuit 100 including four driving modules is taken as an example for illustration. The four driving modules include a driving module 101, a driving module 102, a driving module 103 and a driving module 104. In practical applications, it may adjust or modify the number of driving modules according to specific needs. For example, the number of driving modules is one, the number of driving modules is six, or the number of driving modules is ten, and otherwise. The number of driving modules is not limited in embodiments of the present application.

In an embodiment of the present application, each driving module includes a scan control transistor, a switch transistor and a drive transistor, in each driving module the scan control transistor is connected to the drive transistor via the switch transistor, in each driving module a first end of the scan control transistor is connected to a scan signal terminal Scan, and the light-emitting diode LED and the drive transistors of the driving modules are sequentially connected.

For example, the driving module 101 includes a scan control transistor T1, a switch transistor M1 and a drive transistor Q1, and the scan control transistor T1 is connected to the drive transistor Q1 via the switch transistor M1; the driving module 102 includes a scan control transistor T2, a switch transistor M2 and a drive transistor Q2, and the scan control transistor T2 is connected to the drive transistor Q2 via the switch transistor M2; the driving module 103 includes a scan control transistor T3, a switch transistor M3 and a drive transistor Q3, and the scan control transistor T3 is connected to the drive transistor Q3 via the switch transistor M3; the driving module 104 includes a scan control transistor T4, a switch transistor M4 and a drive transistor Q4, and the scan control transistor T4 is connected to the drive transistor Q4 via the switch transistor M4; and otherwise.

In an embodiment of the present application, the driving circuit 100 and the light-emitting diode LED are deployed. The driving circuit 100 includes a plurality of superimposed driving modules, and a corresponding number of driving modules are selectively conducted according to a preset grayscale. Each driving module includes a scan control transistor, a switch transistor and a drive transistor. By switching on different switch transistors and selectively conducting or enabling one or more drive transistors, different sizes of electric currents can be obtained. In such a way, the electric current passing through the light-emitting diode LED may be adjusted. It is convenient to increase the number of brightness levels. Therefore, the embodiment of the present application can better increase the number of grayscales, thereby improving image quality.

For example, in an embodiment, in each driving module a second end of the scan control transistor is connected to the first end of the switch transistor, third ends of the scan control transistors of the driving modules are connected to different data signal terminals, in each driving module the second end of the switch transistor is connected to the third end of a corresponding drive transistor, and in each driving module the third end of the switch transistor is connected to a grounded terminal GND.

The first ends of the drive transistors of the driving modules are connected to different chip select signal terminals, the second end of the drive transistor of a later driving module is connected to the third end of the drive transistor of a previous driving module, the second end of the drive transistor of the driving module located closest to the light-emitting diode is connected to a cathode of the light-emitting diode LED, and an anode of the light-emitting diode LED is connected to a power voltage input terminal VDD.

The drive transistors are selectively switched on by chip select signals inputted via the chip select signal terminals for adjusting an electric current passing through the light-emitting diode LED. When the chip select signal inputted via one chip select signal terminal is high level, the drive transistor connected to the one chip select signal terminal is switched on. When the chip select signals inputted via a plurality of chip select signal terminals are high level, the drive transistors connected to these chip select signal terminals are switched on. Different sizes of electric currents can be obtained by selectively switching on different numbers of drive transistors. In such a way, the electric current passing through the light-emitting diode LED may be adjusted in multiple levels so as to increase the number of brightness levels. Accordingly, the number of grayscales may increase in a further step, thereby further improving the image quality.

For example, in an embodiment, the driving circuit 100 further includes a storage capacitor Cst, in each driving module the second end of the scan control transistor is connected to one end of the storage capacitor Cst, and the other end of the storage capacitor Cst is connected to the grounded terminal GND. The storage capacitor Cst can store the grayscale voltages inputted via the data signal terminals. The electric current passing through the light-emitting diode LED depends on the grayscale voltages. That is, it may adjust the electric current passing through the light-emitting diode LED based on the grayscale voltage stored in the storage capacitor Cst. In such a way, it can further adjust the size of the electric current in multiple levels, that is, it can further increase the number of brightness levels, thereby further increasing the number of grayscales and further improving the image quality.

For example, in an embodiment, the driving circuit 100 may be of an integrated metal-oxide-semiconductor (MOS) chip. The integrated MOS chip includes a plurality of superimposed driving modules and the storage capacitor Cst. The plurality of driving modules and the storage capacitor Cst are disposed inside the integrated MOS chip (MOS IC). By integrating the driving circuit 100, the number of discrete components can be greatly reduced. After the components are integrated, the interference with external electrical signals can be reduced, and it will have a great improvement in the aspect of circuit design, thereby increasing running speed and improving performance.

For example, in an embodiment, the switch transistor is a MOS transistor. Utilization of the MOS transistor is a better choice since its conductivity is controllable.

For example, in an embodiment, the first end may be a gate, the second end may be a drain, and the third end may be a source.

For example, in each driving module the gate of the scan control transistor is connected to the scan signal terminal Scan, the sources of the scan control transistors of the driving modules are connected to different data signal terminals, in each driving module the drain of the MOS transistor is connected to the source of a corresponding drive transistor, and in each driving module the source of the MOS transistor is connected to the grounded terminal GND.

The gates of the drive transistors of the driving modules are connected to different chip select signal terminals, the drain of a later drive transistor is connected to the source of a previous drive transistor, the drain of the drive transistor located closest to the light-emitting diode LED is connected to the cathode of the light-emitting diode LED, and the anode of the light-emitting diode LED is connected to the power voltage input terminal VDD. Among them, the previous one and the later one are distinguished by a distance to the position of the light-emitting diode LED. The closer to the position of the light-emitting diode LED from the drive transistor, the more "the previous"; otherwise, the more "the later".

The four driving modules in FIG. 1 are taken as an example. All the gate of the scan control transistor T1, the gate of the scan control transistor T2, the gate of the scan control transistor T3 and the gate of the scan control transistor T4 are connected to the scan signal terminal Scan. The source of the scan control transistor T1 is connected to a data signal terminal D1, the source of the scan control transistor T2 is connected to a data signal terminal D2, the source of the scan control transistor T3 is connected to a data signal terminal D3, and the source of the scan control transistor T4 is connected to a data signal terminal D4. The drain of the scan control transistor T1 is connected to one end of the storage capacitor Cst and the gate of the MOS transistor M1, the drain of the scan control transistor T2 is connected to the one end of the storage capacitor Cst and the gate of the MOS transistor M2, the drain of the scan control transistor T3 is connected to the one end of the storage capacitor Cst and the gate of the MOS transistor M3, and the drain of the scan control transistor T4 is connected to the one end of the storage capacitor Cst and the gate of the MOS transistor M4. The other end of the storage capacitor Cst is connected to the grounded terminal GND.

The drain of the MOS transistor M1 is connected to the source of the drive transistor Q1, and the source of the MOS transistor M1 is connected to the grounded terminal GND; the drain of the MOS transistor M2 is connected to the source of the drive transistor Q2, and the source of the MOS transistor M2 is connected to the grounded terminal GND; the drain of the MOS transistor M3 is connected to the source of the drive transistor Q3, and the source of the MOS transistor M3 is connected to the grounded terminal GND; and the drain of the MOS transistor M4 is connected to the source of the drive transistor Q4, and the source of the MOS transistor M4 is connected to the grounded terminal GND. The grounded terminal GND provides a DC low voltage.

The gate of the drive transistor Q1 is connected to a chip select signal terminal O1, the drain of the drive transistor Q1 is connected to the cathode of the light-emitting diode LED, and the drive transistor Q1 is the drive transistor located closest to the light-emitting diode LED. The anode of the light-emitting diode LED is connected to the power voltage input terminal VDD, and the voltage inputted via the power voltage input terminal VDD is a DC high voltage. The gate of the drive transistor Q2 is connected to a chip select signal terminal O2, and the drain of the drive transistor Q2 is connected to the source of the drive transistor Q1; the gate of the drive transistor Q3 is connected to a chip select signal terminal O3, and the drain of the drive transistor Q3 is connected to the source of the drive transistor Q2; the gate of the drive transistor Q4 is connected to a chip select signal terminal O4, and the drain of the drive transistor Q4 is connected to the source of the drive transistor Q3.

Figure 3:
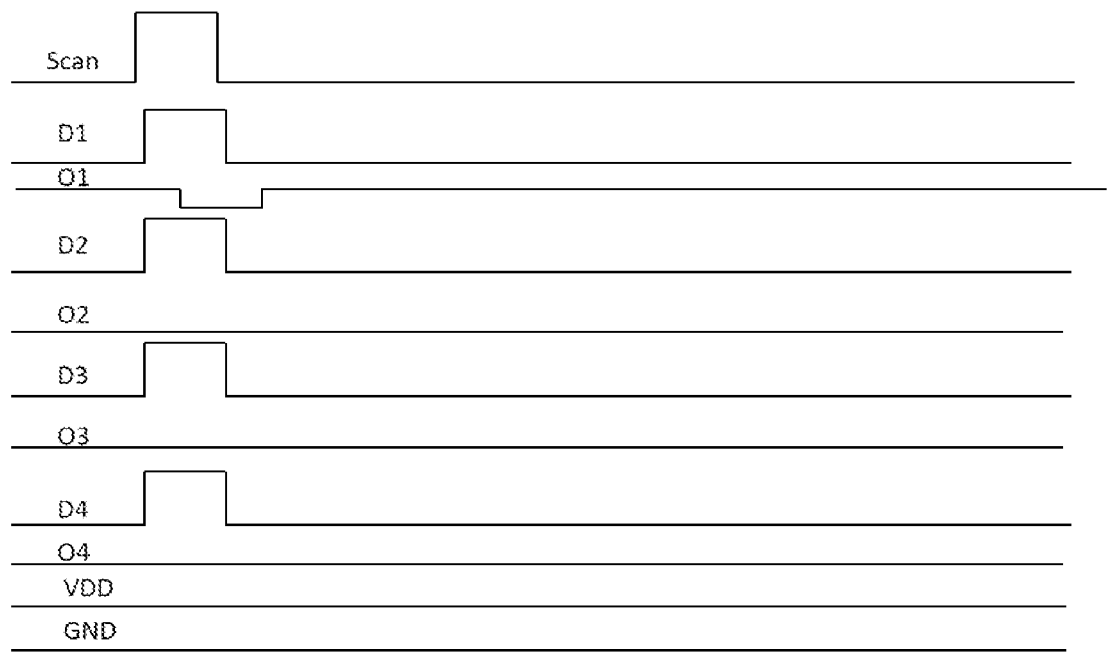
FIG. 3 is a schematic diagram illustrating waveforms of voltage signals in a timing chart provided in an embodiment of the present application.

It needs to be noted that the scan signal terminal Scan, the data signal terminal D1, the data signal terminal D2, the data signal terminal D3, the data signal terminal D4, the power voltage input terminal VDD and the grounded terminal GND may provide voltage signals for the display panel. FIG. 3 is a schematic diagram illustrating waveforms of voltage signals in a timing chart provided in an embodiment of the present application. It can be seen from FIG. 3 that various waveforms are at the scan signal terminal Scan, the data signal terminal D1, the chip select signal terminal O1, the data signal terminal D2, the chip select signal terminal O2, the data signal terminal D3, the chip select signal terminal O3, the data signal terminal D4, the chip select signal terminal O4, the power voltage input terminal VDD and the grounded terminal GND. Generally, the front end will send required voltages to the back end according to image information for creating these voltage signals.

It can be understood that the brightness of the light-emitting diode LED depends on the size of the electric current passing through the light-emitting diode LED. When the electric current passing through the light-emitting diode LED increases, the brightness of the light-emitting diode LED will increase. Conversely, when the electric current passing through the light-emitting diode LED decreases, the brightness of the light-emitting diode LED will decrease.

For example, in an embodiment of the present application, four MOS transistors (namely, MOS transistor M1, MOS transistor M2, MOS transistor M3 and MOS transistor M4) can be utilized to carry out different combinations for realizing different sizes of electric currents, specifically by switching on different numbers of MOS transistors. For example, MOS transistor M1 is switched on; MOS transistor M2 is switched on; MOS transistor M3 is switched on; MOS transistor M4 is switched on; MOS transistor M1 and MOS transistor M2 are switched on; MOS transistor M1 and MOS transistor M3 are switched on; MOS transistor M1 and MOS transistor M4 are switched on; MOS transistor M2 and MOS transistor M3 are switched on; MOS transistor M2 and MOS transistor M4 are switched on; MOS transistor M3 and MOS transistor M4 are switched on; MOS transistor M1, MOS transistor M2 and MOS transistor M3 are switched on; MOS transistor M1, MOS transistor M2 and MOS transistor M4 are switched on; MOS transistor M1, MOS transistor M3 and MOS transistor M4 are switched on; or MOS transistor M2, MOS transistor M3 and MOS transistor M4 are switched on. In such a way, various sizes of electric currents can be obtained.

One or more drive transistors connected to the MOS transistors are selectively switched on by chip select signals for adjusting the electric current passing through the light-emitting diode LED in different levels. For example, the electric current passing through the light-emitting diode LED is I when the drive transistor Q1 is switched on; the electric current passing through the light-emitting diode LED is 3I when the drive transistor Q1 and the drive transistor Q2 are switched on; and otherwise. When the number of switched-on drive transistors is different, the electric current passing through the light-emitting diode LED will be different. Correspondingly, the brightness of the light-emitting diode LED will be different. Therefore, a fine adjustment to the brightness of the light-emitting diode LED can be realized.

Every point seen on the screen of the display panel is a pixel. It is composed of three subpixels, that is, red, green and blue subpixels (RGB). Grayscales refer to different levels of brightness presented by each subpixel. To realize a change of colors of a picture, it is necessary to carry out different brightness control for the three RGB subpixels for mixing them to obtain various colors. For example, for a 6-bit display panel, the 6 bits mean that each subpixel can present 2 to the 6th power of levels of brightness. The more distinct the grayscale, the more realistic the displayed picture. An 8-bit display panel can present 2 to the 8th power of brightness levels, that is, 256 brightness levels, which are called 256 grayscales. As can be seen from this, the more the number of brightness levels, the greater the number of grayscales.

In an embodiment of the present application, by switching on different MOS transistors and selectively enabling corresponding drive transistors, various types of sizes of electric currents passing through the light-emitting diode LED can be obtained, thereby increasing the number of brightness levels of the light-emitting diode LED and increasing the number of grayscales. The greater the number of grayscales, the richer the displayed color, the more delicate the picture, and the easier to express rich details.

It needs be noted that an image is indicated by a gray value with binary bits. That is, grayscale resolution is usually in bits, such as 8-bit and 12-bit. Grayscale resolution is an important indicator used to measure image quality. For example, if a pixel dot of an image is stored using 8 bits, that is, the grayscale resolution is 8-bit, it means that the image would have 256 (2^8) colors, that is, the number of grayscales is 256 and it can express gray values of 0-255; if the pixel dot is stored using 12 bits, that is, the grayscale resolution is 12-bit, it means that the image would have 4096 (2^12) colors, that is, the number of grayscales is 4096 and it can express gray values of 0-4095.

The higher the grayscale resolution of an image, the greater the number of colors can be used in the image, the richer the levels of grayscales, the more grayscale information can be included, and the better the image quality. On the contrary, the image quality gets worse, and false contours (i.e., contours that are not in the original image) will appear. Therefore, in the embodiment of the present application, it is beneficial to increase the number of bits for the grayscale resolution when the number of grayscales increases.

It needs to be noted that in other embodiments, more driving modules may be utilized so as to obtain more levels of electric currents.

It can be seen that in the embodiment of the present application, by switching on different MOS transistors of the driving modules and selectively conducting or enabling one or more drive transistors using the chip select signals, different sizes of electric currents can be obtained. In such a way, the electric current passing through the light-emitting diode LED may be adjusted in different levels. It is convenient to increase the number of brightness levels. Therefore, the embodiment of the present application can better increase the number of grayscales, thereby further improving image quality.

For example, in an embodiment, the electric current passing through the light-emitting diode LED increases by increasing the number of drive transistors selectively switched on via the chip select signal terminals; and the electric current passing through the light-emitting diode LED decreases by decreasing the number of drive transistors selectively switched on via the chip select signal terminals. For example, assuming that the current state is that the drive transistor Q1 and the drive transistor Q2 are selectively switched on, in order to increase the electric current passing through the light-emitting diode LED, the drive transistor Q1, the drive transistor Q2 and the drive transistor Q3 may be selectively switched on, that is, the electric current passing through the light-emitting diode LED increases by increasing the number of drive transistors selectively switched on; in order to decrease the electric current passing through the light-emitting diode LED, the drive transistor Q1 or the drive transistor Q2 may be selectively switched on, that is, the electric current passing through the light-emitting diode LED decreases by decreasing the number of drive transistors selectively switched on.

For example, in an embodiment, the storage capacitor Cst can store the grayscale voltages inputted via the data signal terminals. For example, the storage capacitor Cst stores the grayscale voltages inputted via the data signal terminal D1, the data signal terminal D2, the data signal terminal D3 and the data signal terminal D4. The electric current passing through the light-emitting diode LED depends on the grayscale voltage. For example, when the grayscale voltage inputted via the data signal terminal D1 is high level, the scan control transistor T1 will be switched on and the MOS transistor M1 will be switched on correspondingly; when the grayscale voltage inputted via the data signal terminal D1 is low level, the scan control transistor T1 will be switched off and the MOS transistor M1 will be switched off correspondingly. As can be seen, the levels of the grayscale voltages inputted via the data signal terminal D1, the data signal terminal D2, the data signal terminal D3 and the data signal terminal D4 determine the number of MOS transistors switched on. In accompanying with selective conducting by the chip select signals at the chip select signal terminals, different sizes of electric currents can be obtained. In such a way, the size of electric current passing through the light-emitting diode LED is determined.

For example, in an embodiment, each of the scan control transistor, the MOS transistor and the drive transistor may be a thin-film transistor. For example, the scan control transistor T1, the scan control transistor T2, the scan control transistor T3, the scan control transistor T4, the MOS transistor M1, the MOS transistor M2, the MOS transistor M3, the MOS transistor M4, the drive transistor Q1, the drive transistor Q2, the drive transistor Q3 and the drive transistor Q4 are all thin-film transistors. Thin-film transistors play an important role in the aspect of performance of the display panel. For the MOS transistors, different MOS transistors may have different profiles of channel width/channel length. The channel width is indicated by W and the channel length is indicated by L. That is, different MOS transistors may have different W/L profiles. The electric current passing through the light-emitting diode LED is large when W/L is relatively large; and the electric current passing through the light-emitting diode LED is small when W/L is relatively small.

For example, in an embodiment, a ratio of channel width to channel length may be different for each MOS transistor. For example, the channel width of the MOS transistor M1 is indicated by W1, the channel length of the MOS transistor M1 is indicated by L1, and then the ratio of the channel width to the channel length of the MOS transistor M1 is W1/L1; the channel width of the MOS transistor M2 is indicated by W2, the channel length of the MOS transistor M2 is indicated by L2, and then the ratio of the channel width to the channel length of the MOS transistor M2 is W2/L2; the channel width of the MOS transistor M3 is indicated by W3, the channel length of the MOS transistor M3 is indicated by L3, and then the ratio of the channel width to the channel length of the MOS transistor M3 is W3/L3; the channel width of the MOS transistor M4 is indicated by W4, the channel length of the MOS transistor M4 is indicated by L4, and then the ratio of the channel width to the channel length of the MOS transistor M4 is W4/L4.

When the ratio W1/L1 of the channel width to the channel length of the MOS transistor M1, the ratio W2/L2 of the channel width to the channel length of the MOS transistor M2, the ratio W3/L3 of the channel width to the channel length of the MOS transistor M3 and the ratio W4/L4 of the channel width to the channel length of the MOS transistor M4 are different from each other, corresponding electric currents passing through the light-emitting diode LED will be different as well. For example, assuming that the ratio W2/L2 of the channel width to the channel length of the MOS transistor M2 is greater than the ratio W1/L1 of the channel width to the channel length of the MOS transistor M1, the electric current passing through the light-emitting diode LED is denoted as I when the MOS transistor M1 is switched on, and the electric current passing through the light-emitting diode LED is denoted as I2 when the MOS transistor M2 is switched on. Then, I2 is greater than I.

It needs to be noted that in other embodiments, the ratio of channel width to channel length of the MOS transistor in each driving module can also be set to be identical. By switching on different numbers of MOS transistors and selectively enabling corresponding drive transistors, various sizes of electric currents can be obtained, thereby increasing the number of brightness levels of the light-emitting diode LED and increasing the number of grayscales. It is beneficial to increase the number of bits for the grayscale resolution.

For example, in an embodiment, the ratios of the channel width to the channel length for the MOS transistors are different integral multiples of the ratio of the channel width to the channel length of the MOS transistor located closest to the light-emitting diode. For example, the MOS transistor located closest to the light-emitting diode LED is the MOS transistor M1, the ratio of channel width to channel length of the MOS transistor M1 is W1/L1=W/L, the ratio of channel width to channel length of the MOS transistor M2 is W2/L2=2W/L, the ratio of channel width to channel length of the MOS transistor M3 is W3/L3=3W/L, the ratio of channel width to channel length of the MOS transistor M4 is W4/L4=4W/L, and so on.

For example, in the embodiment of the present application, DH is used to represent high level, and DL is used to represent low level. When the data signal inputted from the data signal terminal D1 is high level and the data signals inputted from other data signal terminals are low level (that is, the data signal inputted from the data signal terminal D1 is DH and the data signals inputted from other data signal terminals are DL), the scan control transistor T1 is switched on, the MOS transistor M1 is switched on, the chip select signal inputted from the chip select signal terminal O1 is DH, the drive transistor Q1 is switched on, and the electric current passing through the light-emitting diode LED is I.

When the data signal inputted from the data signal terminal D2 is high level and the data signals inputted from other data signal terminals are low level (that is, the data signal inputted from the data signal terminal D2 is DH and the data signals inputted from other data signal terminals are DL), the scan control transistor T2 is switched on, the MOS transistor M2 is switched on, the chip select signal inputted from the chip select signal terminal O2 is DH, the drive transistor Q2 is switched on, and the electric current passing through the light-emitting diode LED is I2, where I2=2I.

When the data signal inputted from the data signal terminal D3 is high level and the data signals inputted from other data signal terminals are low level (that is, the data signal inputted from the data signal terminal D3 is DH and the data signals inputted from other data signal terminals are DL), the scan control transistor T3 is switched on, the MOS transistor M3 is switched on, the chip select signal inputted from the chip select signal terminal O3 is DH, the drive transistor Q3 is switched on, and the electric current passing through the light-emitting diode LED is I3, where I3=3I.

When the data signal inputted from the data signal terminal D4 is high level and the data signals inputted from other data signal terminals are low level (that is, the data signal inputted from the data signal terminal D4 is DH and the data signals inputted from other data signal terminals are DL), the scan control transistor T4 is switched on, the MOS transistor M4 is switched on, the chip select signal inputted from the chip select signal terminal O4 is DH, the drive transistor Q4 is switched on, and the electric current passing through the light-emitting diode LED is I4, where I4=4I.

For example, when the data signal inputted from the data signal terminal D1 is DH, the data signal inputted from the data signal terminal D2 is DH and the data signals inputted from other data signal terminals are DL, the scan control transistor T1 is switched on, the MOS transistor M1 is switched on, the scan control transistor T2 is switched on, the MOS transistor M2 is switched on, the drive transistor Q1 and the drive transistor Q2 are correspondingly switched on, and the electric current passing through the light-emitting diode LED is I+I2=3I.

In another example, when the data signal inputted from the data signal terminal D1 is DH, the data signal inputted from the data signal terminal D2 is DH, the data signal inputted from the data signal terminal D3 is DH and the data signals inputted from other data signal terminal are DL, the scan control transistor T1 is switched on, the MOS transistor M1 is switched on, the scan control transistor T2 is switched on, the MOS transistor M2 is switched on, the scan control transistor T3 is switched on, the MOS transistor M3 is switched on, the drive transistor Q1, the drive transistor Q2 and the drive transistor Q3 are correspondingly switched on, and the electric current passing through the light-emitting diode LED is I+I2+I3=6I.

In yet another example, when the data signal inputted from the data signal terminal D1 is DH, the data signal inputted from the data signal terminal D2 is DH, the data signal inputted from the data signal terminal D3 is DH and the data signal inputted from the data signal terminal D4 is DH, the scan control transistor T1 is switched on, the MOS transistor M1 is switched on, the scan control transistor T2 is switched on, the MOS transistor M2 is switched on, the scan control transistor T3 is switched on, the MOS transistor M3 is switched on, the scan control transistor T4 is switched on, the MOS transistor M4 is switched on, the drive transistor Q1, the drive transistor Q2, the drive transistor Q3 and the drive transistor Q4 are correspondingly switched on, and the electric current passing through the light-emitting diode LED is I+I2+I3+I4=10I.

For example, when the data signal inputted from the data signal terminal D2 is DH, the data signal inputted from the data signal terminal D3 is DH and the data signals inputted from other data signal terminals are DL, the scan control transistor T2 is switched on, the MOS transistor M2 is switched on, the scan control transistor T3 is switched on, the MOS transistor M3 is switched on, the drive transistor Q2 and the drive transistor Q3 are correspondingly switched on, and the electric current passing through the light-emitting diode LED is I2+I3=5I. For example, when the data signal inputted from the data signal terminal D2 is DH, the data signal inputted from the data signal terminal D3 is DH, the data signal inputted from the data signal terminal D4 is DH and the data signals inputted from other data signal terminal are DL, the scan control transistor T2 is switched on, the MOS transistor M2 is switched on, the scan control transistor T3 is switched on, the MOS transistor M3 is switched on, the scan control transistor T4 is switched on, the MOS transistor M4 is switched on, the drive transistor Q2, the drive transistor Q3 and the drive transistor Q4 are correspondingly switched on, and the electric current passing through the light-emitting diode LED is I2+I3+I4=9I.

It can be seen that by switching on different numbers of MOS transistors and selectively enabling corresponding drive transistors, various sizes of electric currents can be obtained, thereby enlarging a range for adjusting the electric current passing through the light-emitting diode LED, increasing the number of brightness levels of the light-emitting diode LED and increasing the number of grayscales. It is beneficial to increase the number of bits for the grayscale resolution.

For example, in an embodiment, the electric current passing through the light-emitting diode LED may increase as the ratio of channel width to channel length of the MOS transistor increases. That is, when W/L increases, the electric current passing through the light-emitting diode LED will increase. For example, the electric current passing through the light-emitting diode LED is I when the ratio of channel width to channel length of the MOS transistor M1 is W1/L1=W/L, the electric current passing through the light-emitting diode LED is I2=2I when the ratio of channel width to channel length of the MOS transistor M2 is W2/L2=2W/L, and then I2 is greater than I.

In another example, the electric current passing through the light-emitting diode LED is I3=3I when the ratio of channel width to channel length of the MOS transistor M3 is W3/L3=3W/L, and then I3 is greater than I and is greater than I2. It can be seen that when the ratio of channel width to channel length of the MOS transistor increases, the electric current passing through the light-emitting diode LED will increase as well. Deploying the MOS transistors having different ratios of channel width to channel length is to further enlarge a range for the electric current adjustment, thereby further increasing the number of brightness levels, increasing the number of grayscales and further increasing the number of bits for grayscale resolution.

For example, in one possible implementation, the electric current passing through the light-emitting diode LED may decrease by switching on the MOS transistors having small ratios of channel width to channel length. For example, assuming that the current state is that the MOS transistor M3 is switched on and the drive transistor Q3 is selectively enabled, in order to decrease the electric current passing through the light-emitting diode LED, the MOS transistor M3 is switched off and the drive transistor Q3 is selectively disabled, and then the MOS transistor M1 is switched on and the driving transistor Q1 is selectively enabled, or the MOS transistor M2 is switched on and the driving transistor Q2 is selectively enabled. In this way, it can decrease the electric current passing through the light-emitting diode LED.

In another example, assuming that the current state is that the MOS transistor M3 is switched on and the drive transistor Q3 is selectively enabled, and the MOS transistor M4 is switched on and the drive transistor Q4 is selectively enabled, in order to decrease the electric current passing through the light-emitting diode LED, the MOS transistor M4 is switched off and the drive transistor Q4 is selectively disabled, and then the MOS transistor M1 is switched on and the driving transistor Q1 is selectively enabled, or the MOS transistor M2 is switched on and the driving transistor Q2 is selectively enabled. In this way, it can decrease the electric current passing through the light-emitting diode LED. In practical applications, it may determine which MOS transistors to be switched on and which drive transistors to be selectively enabled according to specific needs on electric current adjustment. The selection is not limited in the embodiments of the present application.

For example, in an embodiment, when a data signal inputted via a target data signal terminal is high level and the data signals inputted via other data signal terminals are low level, the MOS transistor connected to the target data signal terminal can be switched on. For example, when the data signal inputted via the data signal terminal D1 is high level and the data signals inputted via other data signal terminals are low level, the MOS transistor M1 connected to the data signal terminal D1 is switched on. When the data signal inputted via the data signal terminal D2 is high level and the data signals inputted via other data signal terminals are low level, the MOS transistor M2 connected to the data signal terminal D2 is switched on.

When the data signal inputted via the data signal terminal D3 is high level and the data signals inputted via other data signal terminals are low level, the MOS transistor M3 connected to the data signal terminal D3 is switched on. When the data signal inputted via the data signal terminal D4 is high level and the data signals inputted via other data signal terminals are low level, the MOS transistor M4 connected to the data signal terminal D4 is switched on. In preparing the electric current, it may determine which MOS transistors are required to be switched on based on the drive transistors that are required to be selectively enabled. When the data signals inputted to these MOS transistors required to be switched on are high level, these MOS transistors can thus be switched on. For the MOS transistors not required to be switched on, the data signals inputted via the data signal terminals connected thereto may be low level.

For example, in an embodiment, the target data signal terminal is defined by one data signal terminal or by different data signal terminals. For example, in the case that the target data signal terminal is defined by one data signal terminal, if the target data signal terminal is the data signal terminal D1, the MOS transistor M1 is switched on when the data signal inputted from the data signal terminal D1 is high level. If the target data signal terminal is the data signal terminal D3, the MOS transistor M3 is switched on when the data signal inputted from the data signal terminal D3 is high level.

In the case that the target data signal terminal is defined by two data signal terminals, if the target data signal terminal is directed to the data signal terminal D1 and the data signal terminal D2, the MOS transistor M1 and the MOS transistor M2 are switched on. If the target data signal terminal is directed to the data signal terminal D2 and the data signal terminal D3, the MOS transistor M2 and the MOS transistor M3 are switched on.

In the case that the target data signal terminal is defined by three data signal terminals, if the target data signal terminal is directed to the data signal terminal D1, the data signal terminal D2 and the data signal terminal D3, the MOS transistor M1, the MOS transistor M2 and the MOS transistor M3 are switched on.

In the case that the target data signal terminal is defined by four data signal terminals, if the target data signal terminal is directed to the data signal terminal D1, the data signal terminal D2, the data signal terminal D3 and the data signal terminal D4, the MOS transistor M1, the MOS transistor M2, the MOS transistor M3 and the MOS transistor M4 are switched on.

For example, in an embodiment, based on the preset grayscale, the chip select signal terminals may divide grayscales independent from the data signal terminals. For example, based on different grayscales, the chip select signal terminal O1, the chip select signal terminal O2, the chip select signal terminal O3 and the chip select signal terminal O4 may divide grayscales independent from the data signal terminal D1, the data signal terminal D2, the data signal terminal D3 and the data signal terminal D4. After dividing the grayscale, the number of grayscales increases. In this way, it is beneficial to increase the number of bits for grayscale resolution.

Figure 4:
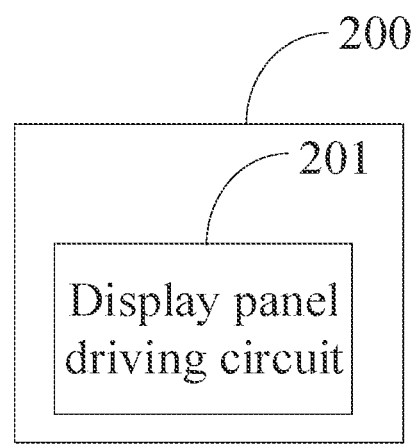
FIG. 4 is a schematic diagram illustrating a display panel provided in an embodiment of the present application.

In an embodiment, the present application further provides a display panel. FIG. 4 is a schematic diagram illustrating a display panel provided in an embodiment of the present application. The display panel 200 includes the display panel driving circuit 201 provided in the embodiment of the present application.

It needs to be noted that the various embodiments described above may be joined or cooperated to increase brightness levels of the light-emitting diode LED by creating different sizes of electric currents, thereby increasing the number of grayscales. It is beneficial to increase the number of bits for grayscale resolution, and details are not repeated herein.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different approaches to implement the described functions for each particular application, but it should not be considered that the implementation goes beyond the scope of the present invention.

It may be clearly understood by a person skilled in the art that, for ease and brevity of description, for a detailed working process of the foregoing system, apparatus, and unit, reference may be made to a corresponding process in the foregoing embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the presented or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts presented as units may or may not be physical units, may be located in one position, or may be distributed on a plurality of network units. Some or all of the units may be selected according to actual requirements to achieve the purposes of the solutions of the embodiments.

In addition, functional units in the embodiments of the present invention may be integrated into one processor, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the approaches described in the embodiments of the disclosure. The foregoing storage medium includes any medium that can store program code, such as a USB flash drive, a removable hard disk, a Read-Only Memory (ROM), a Random Access Memory (RAM), a magnetic disk, or an optical disc.

What is claimed is:

1. A display panel driving circuit, comprising:
a driving circuit and a light-emitting diode, the driving circuit connected to the light-emitting diode,
wherein the driving circuit comprises a plurality of superimposed driving modules, and a corresponding number of driving modules are selectively conducted according to a preset grayscale,
wherein each driving module comprises a scan control transistor, a switch transistor and a drive transistor, in each driving module the scan control transistor is connected to the drive transistor via the switch transistor, in each driving module a first end of the scan control transistor is connected to a scan signal terminal, and the light-emitting diode and the drive transistors of the driving modules are sequentially connected,
wherein in each driving module a second end of the scan control transistor is connected to the first end of the switch transistor, third ends of the scan control transistors of the driving modules are connected to different data signal terminals, in each driving module the second end of the switch transistor is connected to the third end of a corresponding drive transistor, and in each driving module the third end of the switch transistor is connected to a grounded terminal; and
wherein the first ends of the drive transistors of the driving modules are connected to different chip select signal terminals, the second end of the drive transistor of a later driving module is connected to the third end of the drive transistor of a previous driving module, the second end of the drive transistor of the driving module located closest to the light-emitting diode is connected to a cathode of the light-emitting diode, an anode of the light-emitting diode is connected to a power voltage input terminal, and the drive transistors are selectively switched on by chip select signals inputted via the chip select signal terminals for adjusting an electric current passing through the light-emitting diode.

2. The display panel driving circuit according to claim 1, wherein the driving circuit comprises a storage capacitor, in each driving module the second end of the scan control transistor is connected to one end of the storage capacitor, and the other end of the storage capacitor is connected to the grounded terminal.

3. The display panel driving circuit according to claim 2, wherein the storage capacitor is configured to store grayscale voltages inputted via the data signal terminals.

4. The display panel driving circuit according to claim 2, wherein the driving circuit is of an integrated MOS chip.

5. The display panel driving circuit according to claim 4, wherein the plurality of driving modules and the storage capacitor are disposed inside the integrated MOS chip.

6. The display panel driving circuit according to claim 1, wherein the switch transistor is a metal—oxide—semiconductor (MOS) transistor.

7. The display panel driving circuit according to claim 6, wherein the scan control transistor, the MOS transistor and the drive transistor are thin-film transistors.

8. The display panel driving circuit according to claim 6, wherein the first end is a gate, the second end is a drain, and the third end is a source.

9. The display panel driving circuit according to claim 6, wherein a ratio of channel width to channel length is different for each MOS transistor.

10. The display panel driving circuit according to claim 9, wherein the ratios of the channel width to the channel length for the MOS transistors are different integral multiples of the ratio of the channel width to the channel length of the MOS transistor located closest to the light-emitting diode.

11. The display panel driving circuit according to claim 6, wherein when a data signal inputted via a target data signal terminal is high level and other data signals inputted via other data signal terminals are low level, the MOS transistor connected to the target data signal terminal is switched on.

12. The display panel driving circuit according to claim 11, wherein the target data signal terminal is defined by one data signal terminal or by different data signal terminals.

13. The display panel driving circuit according to claim 11, wherein based on the preset grayscale, the chip select signal terminals divide grayscales independent from the data signal terminals.

14. A display panel, comprising the display panel driving circuit according to claim 1.

* * * * *